United States Patent
Wang et al.

(10) Patent No.: US 8,506,091 B2
(45) Date of Patent: Aug. 13, 2013

(54) ILLUMINATION APPARATUS AND PROJECTION APPARATUS

(75) Inventors: Sze-Ke Wang, Hsin-Chu (TW); Tzu-Yi Yang, Hsin-Chu (TW); Yu-Ching Chen, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 285 days.

(21) Appl. No.: 13/182,460

(22) Filed: Jul. 14, 2011

(65) Prior Publication Data

US 2012/0099082 A1 Apr. 26, 2012

(30) Foreign Application Priority Data

Oct. 21, 2010 (CN) .......................... 2010 1 0528314

(51) Int. Cl.
*G03B 21/00* (2006.01)
*G03B 21/14* (2006.01)
*G03B 21/26* (2006.01)
*F21V 9/00* (2006.01)

(52) U.S. Cl.
USPC ................. 353/84; 353/31; 353/94; 362/231; 362/293

(58) Field of Classification Search
USPC ............ 353/20, 30–31, 84, 94, 122; 362/19, 362/227, 230–231, 293, 326, 328
See application file for complete search history.

(56) References Cited

U.S. PATENT DOCUMENTS

| 7,040,774 | B2 | 5/2006 | Beeson et al. | |
|---|---|---|---|---|
| 7,070,300 | B2 | 7/2006 | Harbers et al. | |
| 7,497,581 | B2 * | 3/2009 | Beeson et al. | 362/84 |
| 7,845,822 | B2 * | 12/2010 | Bierhuizen et al. | 362/230 |
| 8,115,217 | B2 * | 2/2012 | Duong et al. | 257/88 |
| 8,172,415 | B2 * | 5/2012 | Wegh et al. | 362/84 |
| 2005/0225882 | A1 | 10/2005 | Kwok | |
| 2013/0100417 | A1 * | 4/2013 | Yang et al. | 353/31 |

FOREIGN PATENT DOCUMENTS

| CN | 1273641 | 11/2000 |
|---|---|---|
| CN | 1811573 | 8/2006 |
| CN | 101532642 | 9/2009 |
| DE | 102008062791 | 7/2010 |
| JP | 2003140257 | 5/2003 |

OTHER PUBLICATIONS

"First Office Action of China Counterpart Application" with English translation thereof, issued on Mar. 5, 2013, p. 1-p. 13, in which the listed references were cited.

* cited by examiner

*Primary Examiner* — Tony Ko
*Assistant Examiner* — Jori S Reilly-Diakun
(74) *Attorney, Agent, or Firm* — Jianq Chyun IP Office

(57) ABSTRACT

An illumination apparatus including a first light emitting device, a first phosphor layer, a second light emitting device and a second phosphor layer and a beam combining element is provided. The first light emitting device is capable of providing a first light beam and the first phosphor layer is disposed on the transmission path of the first light beam. The second light emitting device is disposed opposite to the first light emitting device and for providing a second light beam, wherein the second phosphor layer is disposed on the transmission path of the second light beam. The beam combining element is disposed between the first phosphor layer and the second phosphor layer. In addition, the invention also provides a projection apparatus.

30 Claims, 6 Drawing Sheets

ILLUMINATION APPARATUS AND PROJECTION APPARATUS

CROSS-REFERENCE TO RELATED APPLICATION

This application claims the priority benefit of China application serial no. 201010528314.0, filed Oct. 21, 2010. The entirety of the above-mentioned patent application is hereby incorporated by reference herein and made a part of this specification.

BACKGROUND OF THE INVENTION

1. Field of the Invention

The invention relates to a projection apparatus having an illumination apparatus, and more particularly, to an illumination apparatus using a light beam to excite a phosphor layer so as to advance the luminance performance thereof and a projection apparatus using the same.

2. Description of Related Art

In order to solve the difficult issue that the light-emitting diode (LED) luminance is limited due to insufficient light-emitting efficiency thereof in a conventional optical architecture where a solid-state light emitting component, i.e., an LED, serves as the light source thereof, currently, a mixed light source using a laser diode (LD) and an LED was gradually developed. In the optical architecture of the mixed light source, blue light or ultraviolet laser light serves as a light source and the light beam is guided by a dichroic mirror to be normally incident upon a phosphor substance, for example, a green phosphor, so as to make the material to emit excited green phosphor light. At the time, the green phosphor light can serve as the green light source in the projection illumination. After that, the green phosphor light is guided again by the dichroic mirror and then blended with red light and blue light to finally form a white light source.

In the architecture of a mixed light source with an LD and an LED however, the problem of insufficient light conversion efficiency and insufficient light collection is still persisted. Such problem includes, for example, the light beam of the laser light source excites the phosphor substance one time only.

U.S. Pat. No. 7,070,300 discloses an illumination apparatus, where the illumination light source is LED and the light ray emitted by the light source gets a smaller divergence angle by means of the reflection layer on a beam-bunching device, so that the light beam can be more concentrative and emitted to a dichroic mirror. Thereafter, the light beam is reflected by a reflection mirror to a wavelength conversion component and a radiance enhancement structure. At the time, the light beam enters the beam-bunching device, and a portion of the light beam would be reflected by the reflection layer on the beam-bunching device so that the angle of incidence thereof for being incident upon the wavelength conversion component and the radiance enhancement structure gets smaller. Then, the light beam arrives at the wavelength conversion component through the radiance enhancement structure. When the light beam strikes onto the wavelength conversion component, an excited light beam is produced, wherein the excited light beam can penetrate the dichroic mirror and the light beam can be transmitted to a radiance enhancement film and a polarization component.

In U.S. Pat. No. 7,040,774, a light-recycling structure is disclosed, the structure includes an LED light source, a fluorescent layer, a reflection layer and an aperture. The phosphor substance in the reflection layer is distributed in spots and the rest is transparent material. When the light emitted by the LED penetrates the phosphor layer and gets a first time reflection by a reflection layer, the reflected light would get a second time reflection to arrive at the aperture. Moreover, when the light is emitted to the phosphor layer, the light is converted into light belonging to a second wavelength range, the light belonging to a second wavelength range is reflected to arrive at the aperture. At the time, the emitted light is a combined light including light belonging to a first wavelength range without conversion and the above-mentioned converted light belonging to a second wavelength range.

SUMMARY OF THE INVENTION

Accordingly, the invention is directed to an illumination apparatus having better luminance performance.

Other objectives and advantages of the invention should be further indicated by the disclosures of the invention, and omitted herein for simplicity.

To achieve one of, a portion of or all of the above-mentioned objectives, or to achieve other objectives, an embodiment of the invention provides an illumination apparatus, which includes a first light emitting device, a first phosphor layer, a second light emitting device, a second phosphor layer and a beam combining element. The first light emitting device is capable of providing a first light beam and the first phosphor layer is disposed on the transmission path of the first light beam. When the first light beam is transmitted to the first phosphor layer, the first phosphor layer would be excited to produce a first color beam. The second light emitting device is disposed opposite to the first light emitting device and for providing a second light beam, wherein the second phosphor layer is disposed on the transmission path of the second light beam. When the second light beam is transmitted to the second phosphor layer, the second phosphor layer would be excited to produce a second color beam. The beam combining element is disposed between the first phosphor layer and the second phosphor layer and for respectively reflecting the first color beam from the first phosphor layer and the second color beam from the second phosphor layer.

In an embodiment of the invention, a portion of the first light beam passes through the beam combining element and is transmitted to the second phosphor layer, and a portion of the second light beam passes through the beam combining element and is transmitted to the first phosphor layer.

In an embodiment of the invention, after the partial first light beam sequentially passes through the first phosphor layer and the beam combining element, the first light beam is transmitted to the second phosphor layer to produce through excitation the second color beam, and after the partial second light beam sequentially passes through the second phosphor layer and the beam combining element, the second light beam is transmitted to the first phosphor layer to produce through excitation the first color beam.

In an embodiment of the invention, the beam combining element includes a first beam splitting unit and a second beam splitting unit, the first beam splitting unit and the second beam splitting unit are disposed in cross, the first beam splitting unit is capable of reflecting the first color beam from the first phosphor layer and the second beam splitting unit is capable of reflecting the second color beam from the second phosphor layer. In an embodiment of the invention, the partial first light beam passes through the first beam splitting unit and is transmitted to the second phosphor layer, and the partial second light beam passes through the second beam splitting unit and is transmitted to the first phosphor layer.

In an embodiment of the invention, the illumination apparatus further includes a first collimated unit and a second collimated unit, wherein the first collimated unit is disposed between the first phosphor layer and the beam combining element and located on the transmission path of the first color beam, and the second collimated unit is disposed between the second phosphor layer and the beam combining element and located on the transmission path of the second color beam.

Another embodiment of the invention provides a projection apparatus including the above-mentioned illumination apparatus, a light valve and a projection lens. The illumination apparatus is suitable to provide an illumination light beam. The light valve is disposed on the transmission path of the illumination light beam and suitable to convert the illumination light beam into an image light beam. The projection lens is disposed on the transmission path of the image light beam and for projecting the image light beam onto a screen.

In an embodiment of the invention, the first light emitting device and the second light emitting device are respectively a laser light emitting device or an LED component. In an embodiment of the invention, the first light emitting device and the second light emitting device are respectively a blue light emitting device or an ultraviolet light emitting device. On the other hand, both the first light emitting device and the second light emitting device are blue light emitting devices or ultraviolet light emitting devices. In an embodiment of the invention, when the first phosphor layer and the second phosphor layer are respectively a red phosphor layer and a green phosphor layer, the first color beam is red light and the second color beam is green light.

In an embodiment of the invention, the illumination apparatus further includes a third light emitting device disposed between the first light emitting device and the second light emitting device for providing a third color beam, wherein the beam combining element is located on the transmission path of the third color beam, and the third color beam after passing through the beam combining element and both the first color beam and the second color beam after both being reflected by the beam combining element are together located on a same transmission path. In an embodiment of the invention, the third light emitting device includes a laser light emitting device or an LED component. In an embodiment of the invention, wavelength ranges of the first color beam, the second color beam and the third color beam are different from each other.

In an embodiment of the invention, the illumination apparatus further includes a first reflective element, disposed at a side of the first light emitting device, wherein the first light emitting device is located between the first reflective element and the first phosphor layer, and the second light beam from the second light emitting device after sequentially passing through the second phosphor layer, the beam combining element and the first phosphor layer is reflected by the first reflective element to be transmitted back to the first phosphor layer.

In an embodiment of the invention, the illumination apparatus further includes a second reflective element disposed at a side of the second light emitting device, wherein the second light emitting device is located between the second reflective element and the second phosphor layer, and the first light beam from the first light emitting device after sequentially passing through the first phosphor layer, the beam combining element and the second phosphor layer is reflected by the second reflective element to be transmitted back to the second phosphor layer.

In an embodiment of the invention, the illumination apparatus further includes a first optical film disposed between the first light emitting device and the first phosphor layer, wherein the first light beam and the second light beam are capable of passing through the first optical film, and the first optical film is capable of reflecting the first color beam.

In an embodiment of the invention, the illumination apparatus further includes a second optical film disposed between the second light emitting device and the second phosphor layer, wherein the first light beam and the second light beam are capable of passing through the second optical film, and the second optical film is capable of reflecting the second color beam.

In an embodiment of the invention, the first color beam and the second color beam both reflected by the beam combining element are located on a same transmission path.

The embodiments of the invention have at least one of following advantages. Firstly, a beam combining element is used to reflect the first color beam and the second color beam, and a portion of the first light beam passes through the beam combining element and is transmitted to the second phosphor layer so as to excite the second phosphor layer, which can advance the utilization ratio of the first light beam and the illumination intensity provided by the overall illumination apparatus. In the same way, a portion of the second light beam passes through the beam combining element and is transmitted to the first phosphor layer so as to excite the first phosphor layer, which can advance the utilization ratio of the second light beam and the illumination intensity provided by the overall illumination apparatus as well. In addition, the invention can use at least one of the optical components of collimated unit, reflection unit and optical film, which can make the illumination apparatus provide better illumination luminance. Moreover, the illumination apparatus of the invention can employ a third light emitting device, and the third color beam provided by the third light emitting device can be blended with the first color beam and the second color beam, so that the illumination apparatus can provide a white light illumination.

In order to make the aforementioned and other features and advantages of the invention comprehensible, several exemplary embodiments accompanied with figures are described in detail below.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
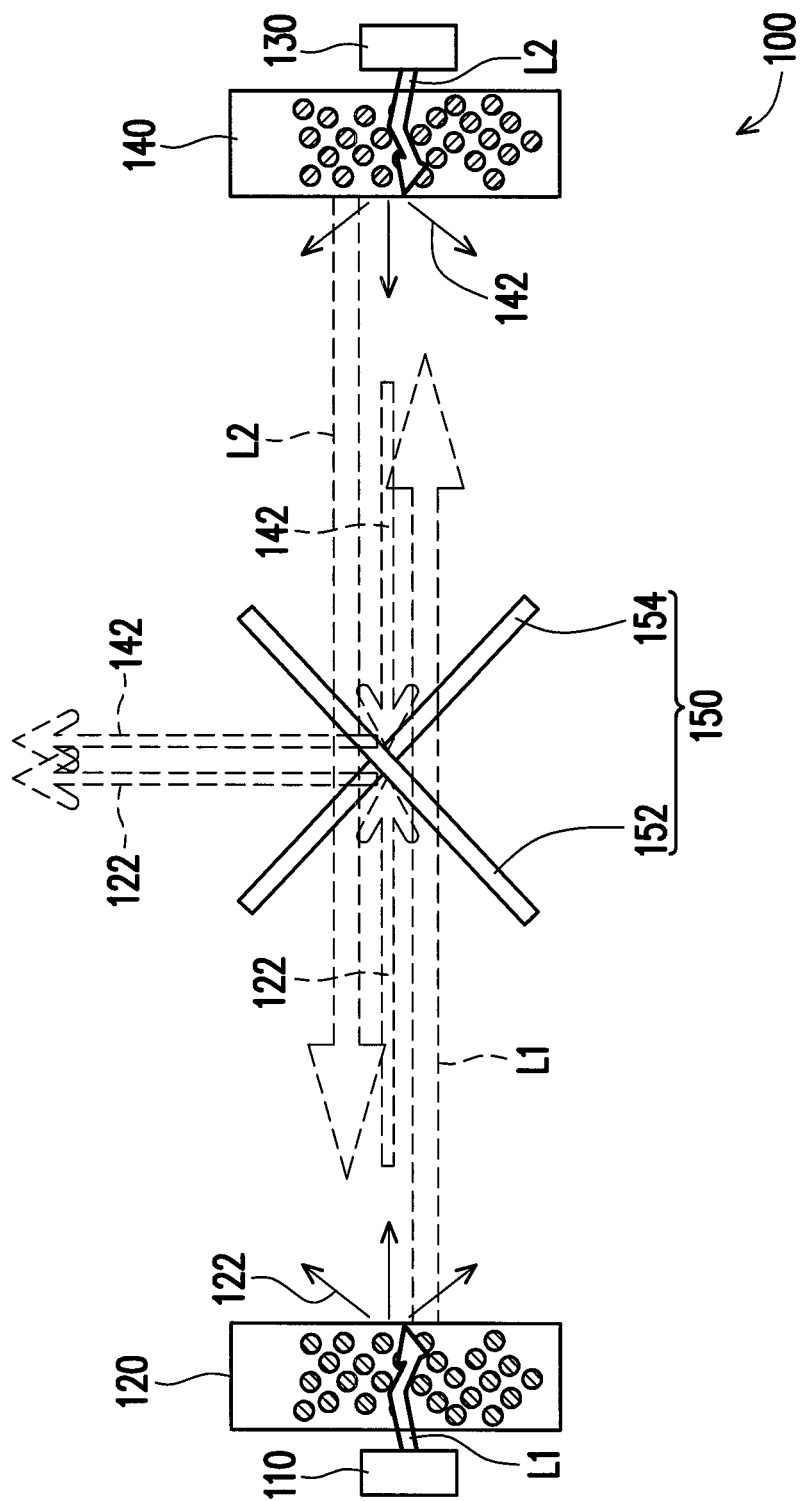
FIG. 1 is a diagram of an illumination apparatus according to an embodiment of the invention.

FIG. 1 is a diagram of an illumination apparatus according to an embodiment of the invention. Referring to FIG. 1, an illumination apparatus 100 includes a first light emitting device 110, a first phosphor layer 120, a second light emitting device 130, a second phosphor layer 140 and a beam combining element 150. The first light emitting device 110 is capable of providing a first light beam L1, wherein the first phosphor layer 120 is disposed on the transmission path of the first light beam L1. When the first light beam L1 is transmitted to the first phosphor layer 120, the first phosphor layer 120 is excited to produce a first color beam 122. In the embodiment, the first light emitting device 110 can be implemented by a laser light emitting device, for example, an LD, wherein since the laser light emitting device features a more concentrative light beam with more strong light intensity, so that when the first light emitting device 110 provides the first light beam L1 to arrive at first phosphor layer 120, a more strong light energy on per unit area of the first phosphor layer 120 would be produced through excitation, which thereby advances the efficiency for the first phosphor layer 120 to produce the excited first color beam 122 and the light intensity thereof.

The second light emitting device 130 is disposed opposite to the first light emitting device 110 for providing a second light beam L2, wherein the second phosphor layer 140 is disposed on the transmission path of the second light beam L2, as shown in FIG. 1. When the second light beam L2 is transmitted to the second phosphor layer 140, the second phosphor layer 140 would be excited to produce a second color beam 142. In the embodiment, the second light emitting device 130 can be implemented by the above-mentioned laser light emitting device, so that when the second light beam L2 provided by the second light emitting device 130 arrives at the second phosphor layer 140, a more strong light energy on per unit area of the second phosphor layer 140 would be produced through excitation, which thereby advances the efficiency for the second phosphor layer 140 to produce the excited second color beam 142 and the light intensity thereof.

The beam combining element 150 is disposed between the first phosphor layer 120 and the second phosphor layer 140 for respectively reflecting the first color beam 122 from the first phosphor layer 120 and the second color beam 142 from the second phosphor layer 140, as shown in FIG. 1. In the embodiment, the beam combining element 150 can be the first beam splitting unit 152 and the second beam splitting unit 154 shown by FIG. 1, wherein the first beam splitting unit 152 and the second beam splitting unit 154 can be disposed in cross. In the embodiment, the first beam splitting unit 152 and the second beam splitting unit 154 can be respectively a dichroic mirror, wherein the dichroic mirror can reflect the light within a specific wavelength range only, while the light of the rest wavelengths would pass through the dichroic mirror. In other words, by appropriately selecting the first beam splitting unit 152 merely reflecting the light with the wavelength of the first color beam 122 and the second beam splitting unit 154 merely reflecting the light with the wavelength of the second color beam 142, it is possible to make the first beam splitting unit 152 reflect the first color beam 122 from the first phosphor layer 120 and the second beam splitting unit 154 reflect the second color beam 142 from the second phosphor layer 140.

In the embodiment, the first light emitting device 110 and the second light emitting device 130 can be the same light emitting device so that the wavelengths of the first light beam L1 and the second light beam L2 are equal to each other. At the time, by selecting two phosphor layers with different colors as the first phosphor layer 120 and the second phosphor layer 140, the first color beam 122 with a wavelength and the second color beam 142 with another wavelength can be produced through excitation. For example, the first light emitting device 110 and the second light emitting device 130 can be respectively implemented by a laser light emitting device belonging to the blue wavelength range or belonging to the ultraviolet wavelength range. In the embodiment, both the first light emitting device 110 and the second light emitting device 130 are respectively, for example, a laser light emitting device belonging to the ultraviolet wavelength range for explanation purpose, which the invention is not limited to. In fact, the two light emitting devices can be different from each other.

If the first phosphor layer 120 and the second phosphor layer 140 are respectively a red phosphor layer and a green phosphor layer, then as the first phosphor layer 120 and the second phosphor layer 140 are irradiated respectively by the first light beam L1 and the second light beam L2, a first color beam 122 with a wavelength and a second color beam 142 with another wavelength can be produced through excitation. For example, the first color beam 122 is red light and the second color beam 142 is green light, wherein the excited first color beam 122 and second color beam 142 are reflected respectively by the first beam splitting unit 152 and the second beam splitting unit 154, and both the reflected first color beam 122 and second color beam 142 would be located on a same transmission path, as shown in FIG. 1.

Although the first light emitting device 110 and the second light emitting device 130 in the embodiment are implemented by laser light emitting devices and make the first light beam L1 and the second light beam L2 respectively irradiate onto the first phosphor layer 120 and the second phosphor layer 140 so as to advance the light-emitting efficiency of the phosphor layers 120 and 140, however in fact, a portion of the first light beam L1 and a portion of the second light beam L2 which do not excite the first phosphor layer and the second phosphor layer still can respectively pass through the phosphor layers 120 and 140. Considering the situation, the embodiment can select the above-mentioned dichroic mirrors serving as the first beam splitting unit 152 and the second beam splitting unit 154, so that the partial first light beam L1 which does not make the first phosphor layer 120 produce the excited first color beam 122 passes through the first beam splitting unit 152 and is transmitted to the second phosphor layer 140 and the partial second light beam L2 which does not make the second phosphor layer 140 produce the excited second color beam 142 passes through the second beam splitting unit 154 and is transmitted to the first phosphor layer 120.

In the embodiment, when the partial first light beam L1 which does not make the first phosphor layer 120 produce the excited first color beam 122 passes through the first beam splitting unit 152 and is transmitted to the second phosphor layer 140, the light beam would excite the second phosphor layer 140 again so as to produce the second color beam 142. In other words, in addition to that the first light beam L1 provided by the first light emitting device 110 can excite the first phosphor layer 120 to produce the first color beam 122, the first light beam L1 which does not yet excite the first phosphor layer 120 can be used once again to excite the second phosphor layer 140 so as to produce the second color beam 142, which can advance the utilization ratio of the light ray and further advance the irradiation light intensity provided by the overall illumination apparatus 100.

In the same way, when the partial second light beam L2 which does not make the second phosphor layer 140 produce the excited second color beam 142 passes through the second beam splitting unit 154 and is transmitted to the first phosphor layer 120, the light beam would excite the first phosphor layer 120 again so as to produce the first color beam 122. In other words, in addition to that the second light beam L2 provided by the second light emitting device 130 can excite the second phosphor layer 140 to produce the second color beam 142, the second light beam L2 which does not yet excite the second phosphor layer 140 can be used once again to excite the first phosphor layer 120 so as to produce the first color beam 122.

Based on the depiction above, the embodiment can use the above-mentioned architecture and mechanism to make the light beams provided by the first light emitting device 110 and the second light emitting device 130 more effectively utilized for exciting the phosphor layers 120 and 140 so as to produce the first color beam 122 and second color beam 142 with more sufficient light intensity, which further advances the luminance of the illumination apparatus 100 to meet the requirement for illumination.

Figure 2:
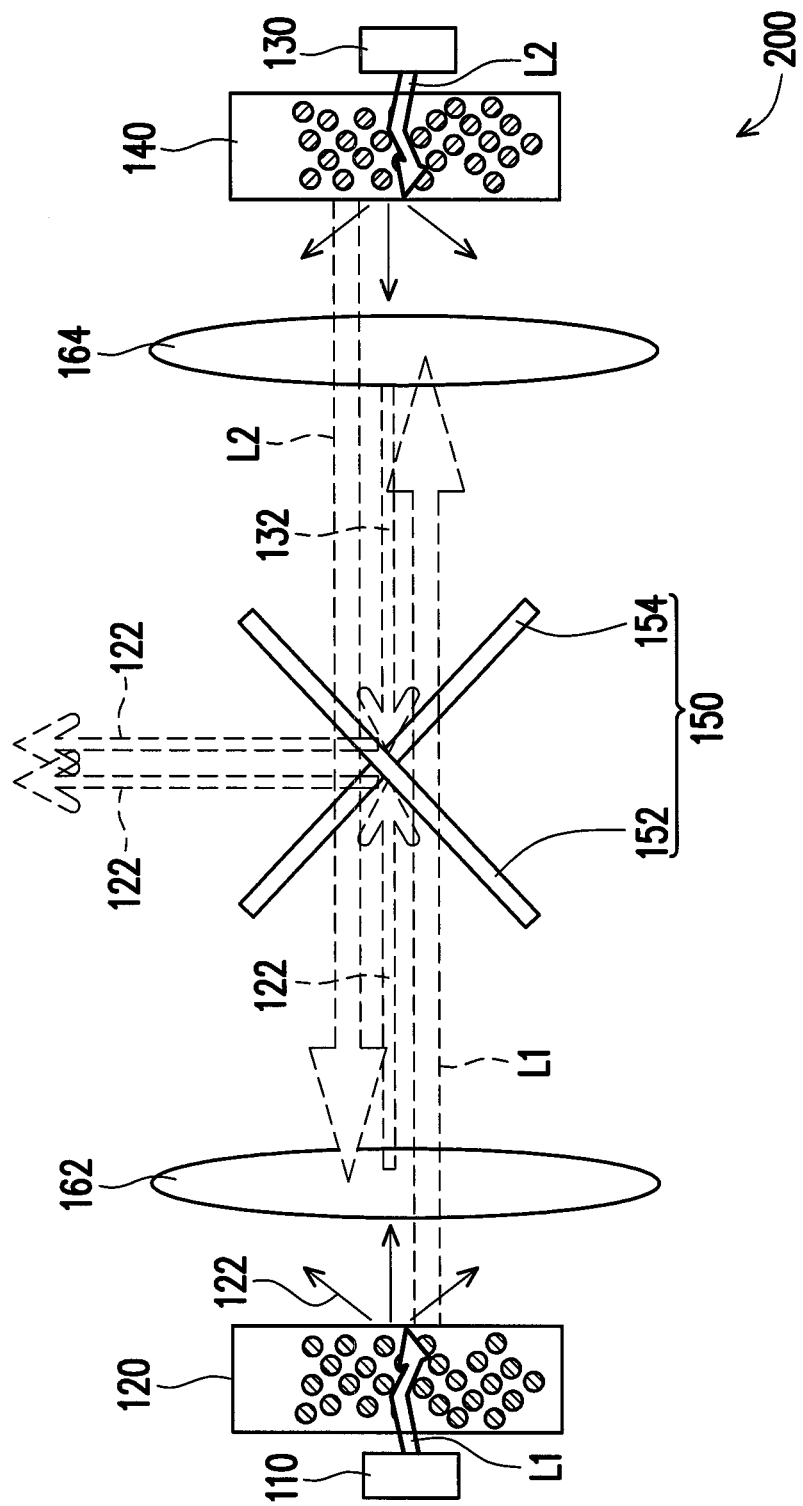
FIG. 2 is a diagram of an illumination apparatus according to another embodiment of the invention.

In an embodiment, in order to more effectively converge the excited first color beam 122 and second color beam 142 transmitted to the beam combining element 150 for advancing the overall illumination intensity, an illumination apparatus 200 further includes a first collimated unit 162 and a second collimated unit 164. The first collimated unit 162 therein is disposed between the first phosphor layer 120 and the beam combining element 150 and located on the transmission path of the first color beam 122, while the second collimated unit 164 is disposed between the second phosphor layer 140 and the beam combining element 150 and located on the transmission path of the second color beam 142. In the embodiment, the first collimated unit 162 and the second collimated unit 164 can be, but not limited to, a convergence lens as shown by FIG. 2.

The illumination apparatus 200 has a structure similar to the illumination apparatus 100, except that the illumination apparatus 200 uses the first collimated unit 162 to effectively converge the excited first color beam 122 and to transmit the light 122 to the first beam splitting unit 152 and uses the second collimated unit 164 to effectively converge the excited second color beam 142 and transmit the light 142 to the second beam splitting unit 154. In this way, the first color beam 122 and the second color beam 142 after being reflected by the beam combining element 150 would have better light intensity and the illumination intensity provided by the illumination apparatus 200 would be accordingly advanced.

Figure 3:
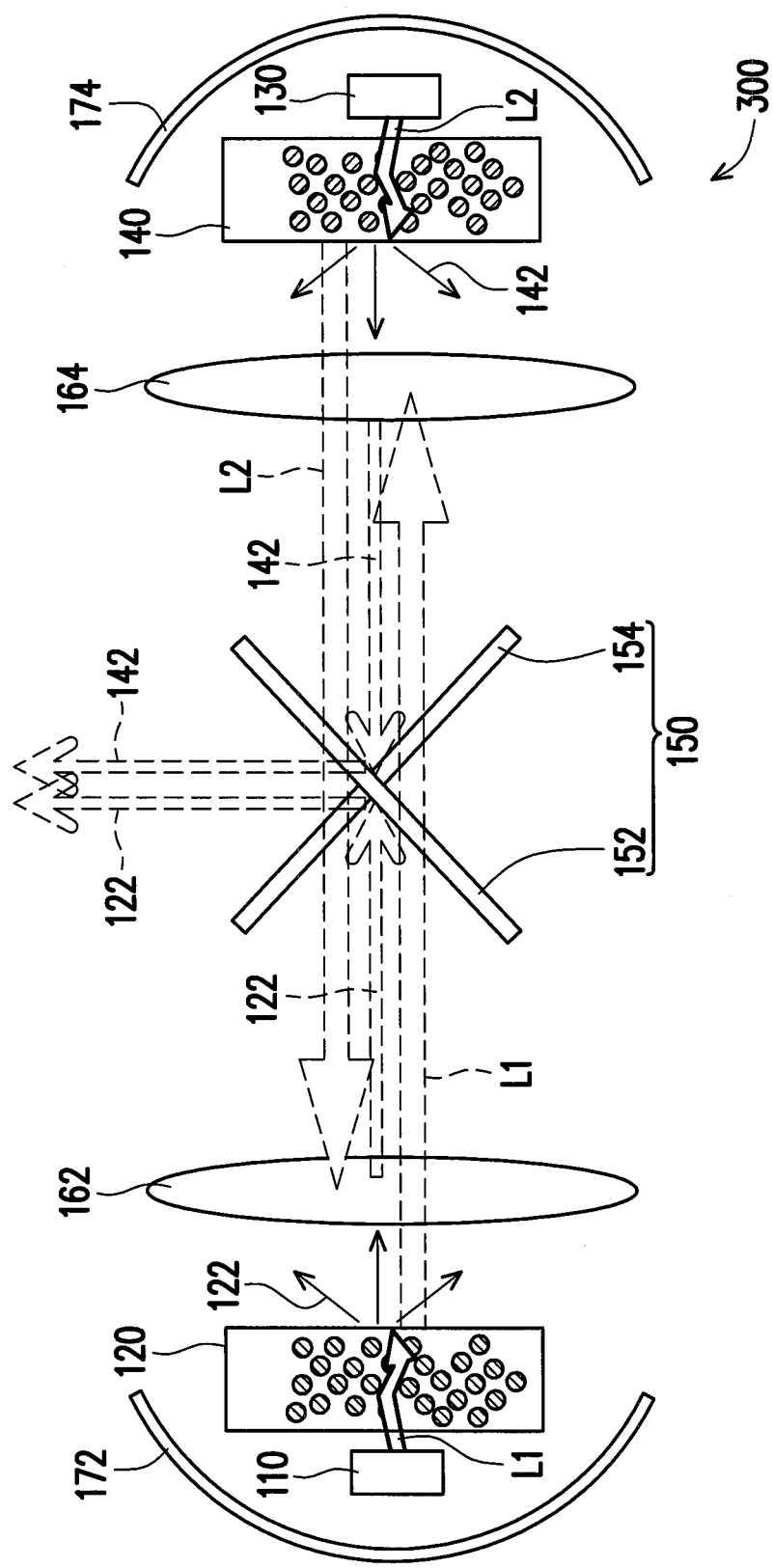
FIG. 3 is a diagram of an illumination apparatus according to yet another embodiment of the invention.

In another embodiment, in order to further advance the overall illumination intensity of the illumination apparatus, an illumination apparatus 300, as shown in FIG. 3, includes a first reflective element 172 and a second reflective element 174. The first reflective element 172 is disposed at a side of the first light emitting device 110 and the first light emitting device 110 is located between the first reflective element 172 and the first phosphor layer 120. The second reflective element 174 is disposed at a side of the second light emitting device 130 and the second light emitting device 130 is located between the second reflective element 174 and the second phosphor layer 140. In the embodiment, after the second light beam L2 from the second light emitting device 130 sequentially passes through the second phosphor layer 140, the beam combining element 150 and the first phosphor layer 120, the second light beam L2 would be reflected by the first reflective element 172 and transmitted back to the first phosphor layer 120, which can advance the utilization ratio of the second light beam L2 of the second light emitting device 130 and advance the light intensity of the first color beam 122 produced through excitation by the first phosphor layer 120.

In the same way, after the first light beam L1 from the first light emitting device 110 sequentially passes through the first phosphor layer 120, the beam combining element 150 and the second phosphor layer 140, the first light beam L1 would be reflected by the second reflective element 174 and transmitted back to the second phosphor layer 140, which can advance the utilization ratio of the first light beam L1 of the first light emitting device 110 and advance the light intensity of the second color beam 142 produced through excitation by the second phosphor layer 140. In the embodiment, the first reflective element 172 and the second reflective element 174 can be light reflection cup, light reflection shield or appropriate light reflective elements.

Based on the depiction above, the illumination apparatus 300 has a structure similar to the illumination apparatus 200, except that the illumination apparatus 300 uses the first reflective element 172 to reflect back the second light beam L2 to the first phosphor layer 120 once again so as to furthermore enhance the light intensity of the first color beam 122 produced through excitation by the first phosphor layer 120. Meanwhile, the illumination apparatus 300 uses the second reflective element 174 to reflect back the first light beam L1 to the second phosphor layer 140 once again so as to furthermore enhance the light intensity of the second color beam 142 produced through excitation by the second phosphor layer 140. By means of the above-mentioned scheme, the first light beam L1 and the second light beam L2 are utilized once more to excite the phosphor layers, which effectively advance the illumination intensity provided by the illumination apparatus 300.

Figure 4:
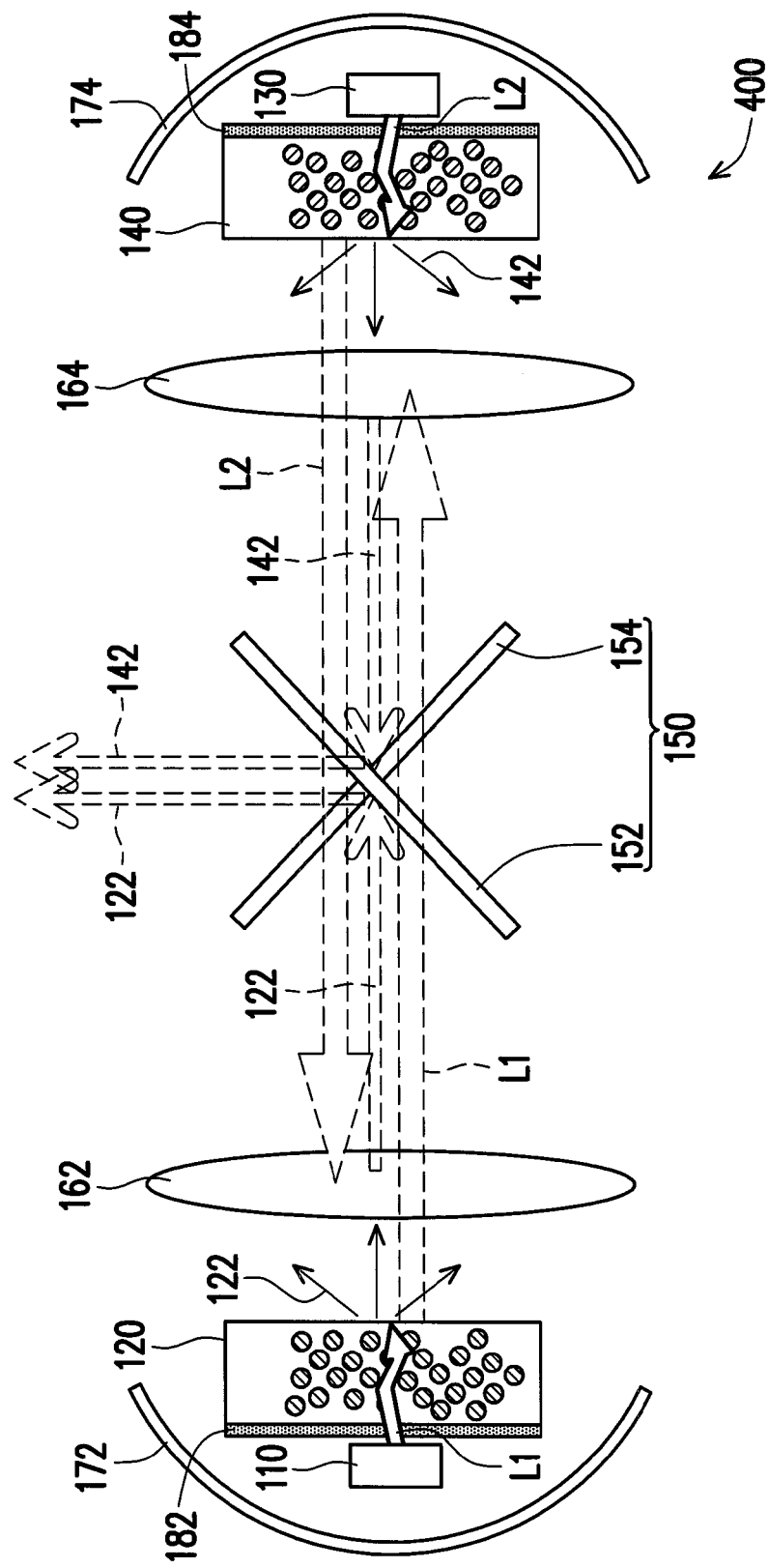
FIG. 4 is a diagram of an illumination apparatus according to yet another embodiment of the invention.

In yet another embodiment, in addition to the above-mentioned scheme that the reflective elements 172 and 174 are used to further advance the overall illumination intensity of the illumination apparatus, other feasible implementation configurations, for example, an illumination apparatus 400 shown in FIG. 4, can be used. The structure of the illumination apparatus 400 is similar to the illumination apparatus 200, except that the illumination apparatus 400 further includes a first optical film 182 and a second optical film 184, wherein the first optical film 182 is disposed between the first light emitting device 110 and the first phosphor layer 120 and the second optical film 184 is disposed between the second light emitting device 130 and the second phosphor layer 140, as shown in FIG. 4.

In the embodiment, the first light beam L1 and the second light beam L2 can pass through the first optical film 182 and the first optical film 182 is capable of reflecting the first color beam 122, so that the first color beam 122 produced through excitation by the first phosphor layer 120 can be almost entirely transmitted to the first dichroic component 152. In the same way, the first light beam L1 and the second light beam L2 can pass through the second optical film 184 and the second optical film 184 is capable of reflecting the second color beam 142, so that the second color beam 142 produced through excitation by the second phosphor layer 140 can be almost entirely transmitted to the second dichroic component 154. In other words, the illumination apparatus 400 can use the first optical film 182 to reflect the most of the first color beam 122 to the beam combining element 150 for advancing the light utilization ratio of the first color beam 122 and use the second optical film 184 to reflect the most of the second color beam 142 to the beam combining element 150 for advancing the light utilization ratio of the second color beam 142. In this way, the illumination intensity provided by the illumination apparatus 400 is effectively advanced.

Figure 5:
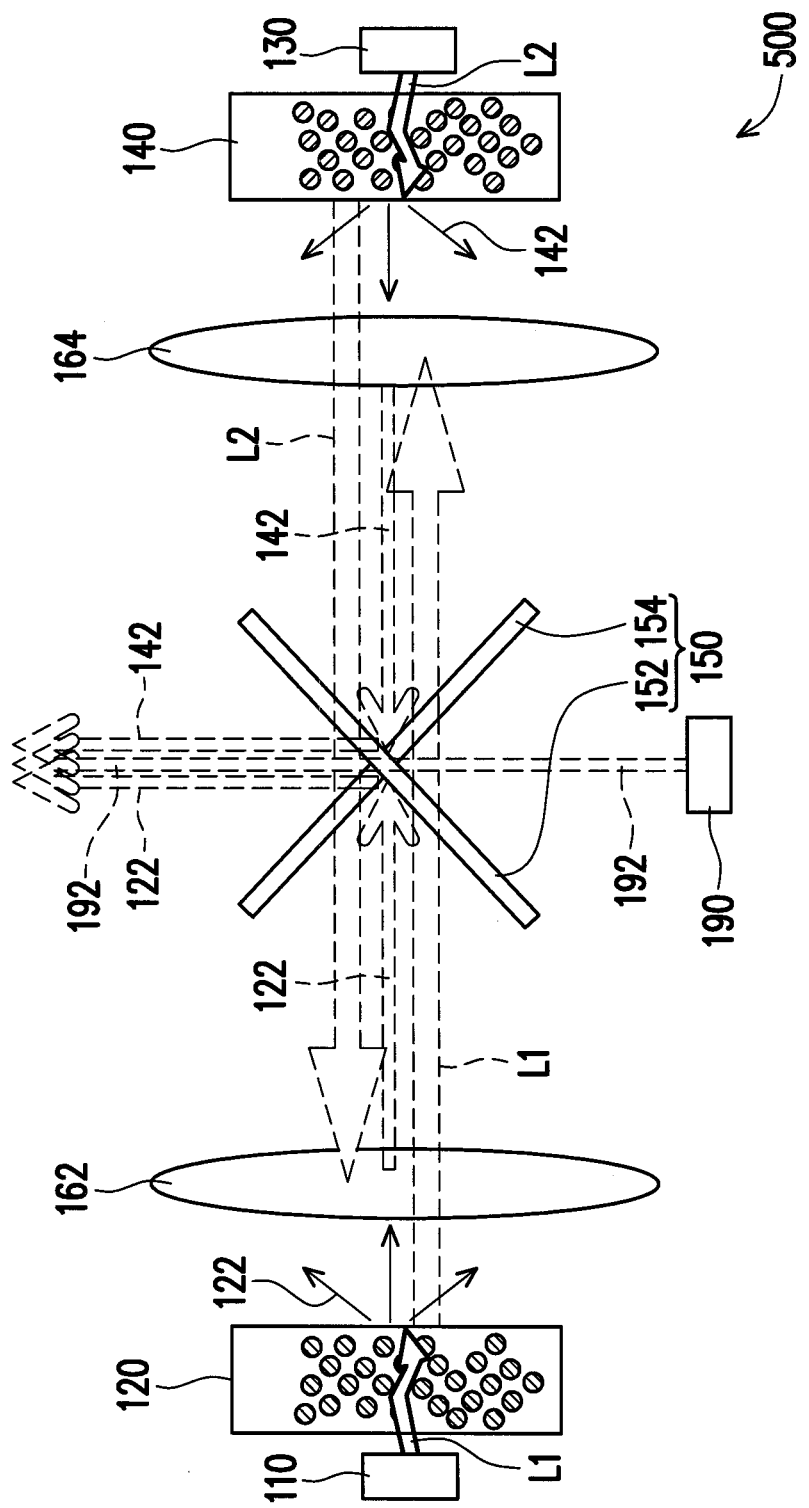
FIG. 5 is a diagram of an illumination apparatus according to yet another embodiment of the invention.

In yet another embodiment, as shown by FIG. 5, in order to make the illumination apparatus provide an illumination light source of, for example, white light, the illumination apparatus 500 includes a third light emitting device 190 disposed between the first light emitting device 110 and the second light emitting device 130 for providing a third color beam 192. The beam combining element 150 therein is located on the transmission path of the third color beam 192, and the third color beam 192 after passing through the beam combining element 150 and both the first color beam 122 and the second color beam 142 after both being reflected by the beam combining element 150 are together located on the same transmission path. In more details, if the first color beam 122 and the second color beam 142 are respectively the above-mentioned red light and green light, the third color beam 192 provided by the third light emitting device 190 can be blue light. In this way, the third color beam 192 after passing through the beam combining element 150 is blended with the red light and the green light to form a white light. In the embodiment, the third light emitting device 190 can be laser light emitting component or light-emitting diode device; moreover, the third light emitting device 190 can be blue light emitting device so as to provide the third color beam with a blue wavelength, which the invention is not limited to.

In the embodiment, the structure of the illumination apparatus 500 is similar to the illumination apparatus 100 except that the illumination apparatus 500 uses the third color beam 192 provided by the third light emitting device 190 for light-blending with the first color beam 122 and the second color beam 142. The first color beam 122, the second color beam 142 and the third color beam 192 therein are respectively, for example, red light, green light and blue light, so that the illumination apparatus 500 can provide a white illumination. It should be noted that the illumination apparatus 500 can also be implemented with the configurations shown in FIGS. 2-4 so as to further advance the illumination luminance thereof.

It should be noted that the above-mentioned colors and the wavelengths of the first color beam 122, the second color beam 142 and the third color beam 192 are used for explaining a concept which needs to be protected by the embodiment, not for limiting the invention. Other light emitting devices with other appropriate wavelengths can be adopted according to the requirement of the user, and the required colors of the phosphor layers should be accordingly altered as well.

Figure 6:
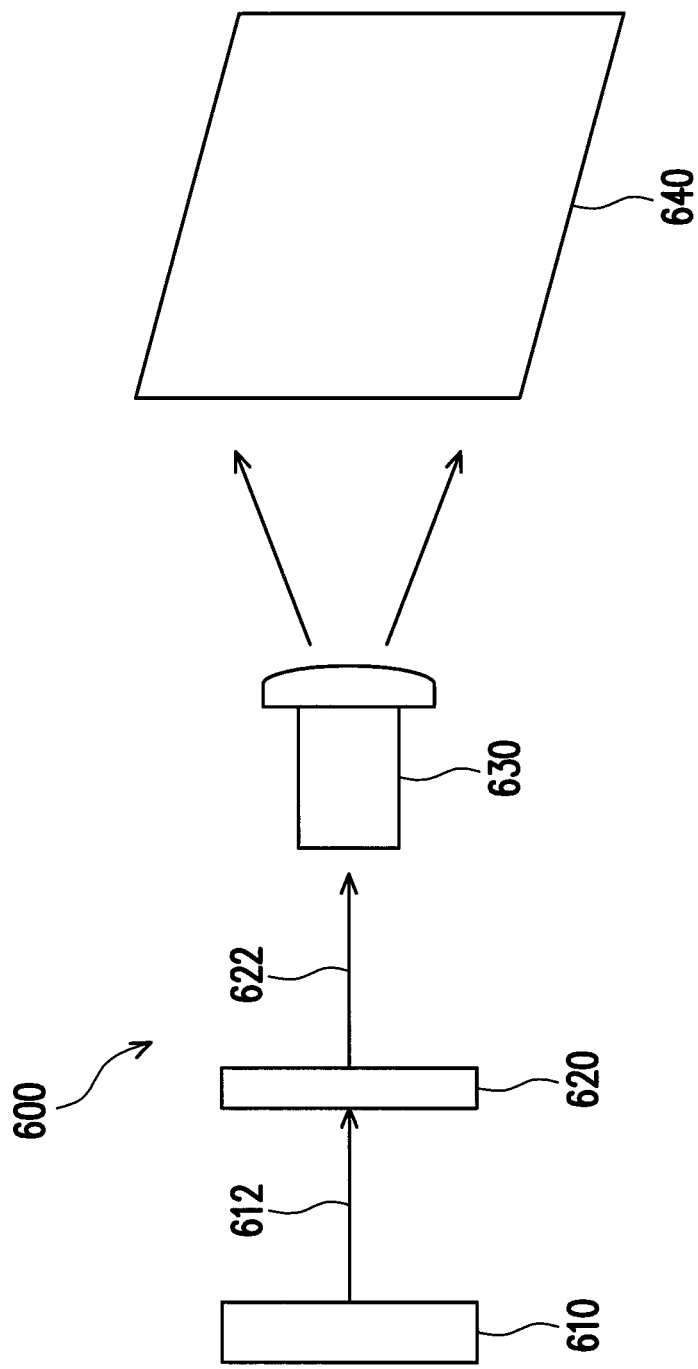
FIG. 6 is a diagram of a projection apparatus according to an embodiment of the invention.

FIG. 6 is a diagram of a projection apparatus according to an embodiment of the invention. Referring to FIG. 6, a projection apparatus 600 includes an illumination apparatus 610, a light valve 620 and a projection lens 630. The illumination apparatus 610 is capable of providing an illumination light beam 612. In the embodiment, the illumination apparatus 610 can be, for example, the above-mentioned illumination apparatuses 100, 200, 300, 400 or 500, so that the illumination apparatus can provide an illumination light beam 612 with better luminance performance. The illumination light beam 612 of the embodiment is the one produced by the above-mentioned first color beam 122, second color beam 142 and third color beam 192 after passing through the beam combining element 150 and being blended with each other.

Continuing to FIG. 6, the light valve 620 is disposed on the transmission path of the illumination light beam 612 for converting the illumination light beam 612 into an image light beam 622. In the embodiment, the light valve 620 is, for example, digital micro-mirror device (DMD); however in other embodiments, the light valve 620 can be liquid-crystal-on-silicon panel (LCOS panel) or other spatial light modulator as well. The projection lens 630 is disposed on the transmission path of the image light beam 622 for projecting the image light beam 622 onto a screen 640, as shown by FIG. 6.

In the embodiment, since the projection apparatus 600 is implemented by the above-mentioned illumination apparatus 100, 200, 300, 400 or 500, the projection apparatus 600 has at least the advantage mentioned above.

In summary, the embodiments of the invention can achieve at least one of following effects. Firstly, a beam combining element is used to reflect the first color beam and the second color beam, and a portion of the first light beam which does not make the first phosphor layer produce the excited first color beam passes through the beam combining element and is transmitted to the second phosphor layer so as to excite the second phosphor layer, which can advance the utilization ratio of the first light beam and the illumination intensity provided by the overall illumination apparatus. In the same way, a portion of the second light beam which does not make the second phosphor layer produce the excited second color beam passes through the beam combining element and is transmitted to the first phosphor layer so as to excite the first phosphor layer, which can advance the illumination intensity provided by the overall illumination apparatus as well.

In addition, the invention can use at least one of the optical components of collimated unit, reflection unit and optical film, which can make the illumination apparatus provide better illumination luminance. Moreover, the illumination apparatus of the invention can employ a third light emitting device, and the third color beam provided by the third light emitting device can be blended with the first color beam and the second color beam, so that the illumination apparatus can provide a white light illumination. Finally, the invention can adopt one of the above-mentioned collimated unit, reflection unit and optical film in the illumination apparatus able to provide a white illumination so as to furthermore advance the luminance performance of the white illumination.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter. In addition, any one of the embodiments or claims of the invention is not necessarily to achieve all of the above-mentioned objectives, advantages or features. The abstract and the title herein are used to assist searching the documentations of the relevant patents, not to limit the claim scope of the invention. Each of the terms "first" and "second" is only a nomenclature used to modify its corresponding elements. These terms are not used to set up the upper limit or lower limit of the number of phosphor layers.

What is claimed is:

1. An illumination apparatus, comprising:
    a first light emitting device, capable of providing a first light beam;
    a first phosphor layer, disposed on the transmission path of the first light beam, wherein when the first light beam is transmitted to the first phosphor layer, the first phosphor layer is excited to produce a first color beam;
    a second light emitting device, disposed opposite to the first light emitting device and capable of providing a second light beam;
    a second phosphor layer, disposed on the transmission path of the second light beam, wherein when the second light beam is transmitted to the second phosphor layer, the second phosphor layer is excited to produce a second color beam; and
    a beam combining element, disposed between the first phosphor layer and the second phosphor layer, wherein the beam combining element is capable of reflecting the first color beam from the first phosphor layer and the second color beam from the second phosphor layer, wherein a portion of the first light beam passes through the first phosphor layer and the beam combining element and is transmitted to the second phosphor layer to produce the second color beam by excitation, and a portion of the second light beam passes through the second phosphor layer and the beam combining element and is transmitted to the first phosphor layer to produce the first color beam by excitation.

2. The illumination apparatus as claimed in claim 1, wherein the beam combining element comprises a first beam splitting unit and a second beam splitting unit, the first beam splitting unit and the second beam splitting unit are disposed in cross, and the first beam splitting unit is capable of reflecting the first color beam from the first phosphor layer, and the second beam splitting unit is capable of reflecting the second color beam from the second phosphor layer.

3. The illumination apparatus as claimed in claim 2, wherein the portion of the first light beam passes through the first beam splitting unit and is transmitted to the second phosphor layer, and the portion of the second light beam passes through the second beam splitting unit and is transmitted to the first phosphor layer.

4. The illumination apparatus as claimed in claim 1, further comprising a first collimated unit and a second collimated unit, wherein the first collimated unit is disposed between the first phosphor layer and the beam combining element and located on the transmission path of the first color beam, and the second collimated unit is disposed between the second phosphor layer and the beam combining element and located on the transmission path of the second color beam.

5. The illumination apparatus as claimed in claim 1, wherein the first light emitting device and the second light emitting device are respectively a laser light emitting device or a light-emitting diode device.

6. The illumination apparatus as claimed in claim 5, wherein the first light emitting device and the second light emitting device are blue light emitting devices or ultraviolet light emitting devices.

7. The illumination apparatus as claimed in claim 1, wherein when the first phosphor layer and the second phosphor layer are respectively a red phosphor layer and a green phosphor layer, the first color beam is red light and the second color beam is green light.

8. The illumination apparatus as claimed in claim 1, further comprising a third light emitting device disposed between the first light emitting device and the second light emitting device, the third light emitting device being capable of providing a third color beam, wherein the beam combining element is located on the transmission path of the third color beam, and the third color beam passed through the beam combining element and both the first color beam and the second color beam reflected by the beam combining element are together located on a same transmission path.

9. The illumination apparatus as claimed in claim 8, wherein the third light emitting device comprises a laser light emitting device or a light-emitting diode device.

10. The illumination apparatus as claimed in claim 8, wherein wavelength ranges of the first color beam, the second color beam and the third color beam are different from each other.

11. The illumination apparatus as claimed in claim 1, further comprising a first reflective element, disposed at a side of the first light emitting device, wherein the first light emitting device is located between the first reflective element and the first phosphor layer, and the second light beam from the second light emitting device after sequentially passing through the second phosphor layer, the beam combining element and the first phosphor layer is reflected by the first reflective element to be transmitted back to the first phosphor layer.

12. The illumination apparatus as claimed in claim 1, further comprising a second reflective element disposed at a side of the second light emitting device, wherein the second light emitting device is located between the second reflective element and the second phosphor layer, and the first light beam from the first light emitting device after sequentially passing through the first phosphor layer, the beam combining element and the second phosphor layer is reflected by the second reflective element to be transmitted back to the second phosphor layer.

13. The illumination apparatus as claimed in claim 1, further comprising a first optical film disposed between the first light emitting device and the first phosphor layer, wherein the first light beam and the second light beam are capable of passing through the first optical film, and the first optical film is capable of reflecting the first color beam.

14. The illumination apparatus as claimed in claim 1, further comprising a second optical film disposed between the second light emitting device and the second phosphor layer, wherein the first light beam and the second light beam are capable of passing through the second optical film, and the second optical film is capable of reflecting the second color beam.

15. The illumination apparatus as claimed in claim 1, wherein the first color beam and the second color beam both reflected by the beam combining element are located on a same transmission path.

16. A projection apparatus, comprising:
    an illumination apparatus, comprising:
        a first light emitting device, capable of providing a first light beam;
        a first phosphor layer, disposed on the transmission path of the first light beam, wherein when the first light beam is transmitted to the first phosphor layer, the first phosphor layer is excited to produce a first color beam;

a second light emitting device, disposed opposite to the first light emitting device for providing a second light beam;

a second phosphor layer, disposed on the transmission path of the second light beam, wherein when the second light beam is transmitted to the second phosphor layer, the second phosphor layer is excited to produce a second color beam; and a beam combining element, disposed between the first phosphor layer and the second phosphor layer, wherein the beam combining element is capable of reflecting the first color beam from the first phosphor layer and the second color beam from the second phosphor layer, and the illumination apparatus is capable of providing an illumination light beam;

a light valve, disposed on the transmission path of the illumination light beam, and the light valve is capable of converting the illumination light beam into an image light beam; and a projection lens, disposed on the transmission path of the image light beam and being capable of projecting the image light beam onto a screen, wherein a portion of the first light beam passes through the first phosphor layer and the beam combining element and is transmitted to the second phosphor layer to produce the second color beam by excitation, and a portion of the second light beam passes through the second phosphor layer and the beam combining element and is transmitted to the first phosphor layer to produce the first color beam by excitation.

17. The projection apparatus as claimed in claim 16, wherein the beam combining element comprises a first beam splitting unit and a second beam splitting unit, the first beam splitting unit and the second beam splitting unit are disposed in cross, the first beam splitting unit is capable of reflecting the first color beam from the first phosphor layer and the second beam splitting unit is capable of reflecting the second color beam from the second phosphor layer.

18. The projection apparatus as claimed in claim 17, wherein the portion of the first light beam passes through the first beam splitting unit and is transmitted to the second phosphor layer, and the portion of the second light beam passes through the second beam splitting unit and is transmitted to the first phosphor layer.

19. The projection apparatus as claimed in claim 16, further comprising a first collimated unit and a second collimated unit, wherein the first collimated unit is disposed between the first phosphor layer and the beam combining element and located on the transmission path of the first light beam, and the second collimated unit is disposed between the second phosphor layer and the beam combining element and located on the transmission path of the second light beam.

20. The projection apparatus as claimed in claim 16, wherein the first light emitting device and the second light emitting device are respectively a laser light emitting device or a light-emitting diode device.

21. The projection apparatus as claimed in claim 20, wherein the first light emitting device and the second light emitting device are blue light emitting devices or ultraviolet light emitting devices.

22. The projection apparatus as claimed in claim 16, wherein when the first phosphor layer and the second phosphor layer are respectively a red phosphor layer and a green phosphor layer, the first color beam is red light and the second color beam is green light.

23. The projection apparatus as claimed in claim 16, further comprising a third light emitting device disposed between the first light emitting device and the second light emitting device, the third light emitting device is capable of providing a third color beam, wherein the beam combining element is located on the transmission path of the third color beam, and the third color beam passed through the beam combining element and both the first color beam and the second color beam reflected by the beam combining element are together located on a same transmission path.

24. The projection apparatus as claimed in claim 23, wherein the third light emitting device comprises a laser light emitting device or a light-emitting diode device.

25. The projection apparatus as claimed in claim 23, wherein wavelength ranges of the first color beam, the second color beam and the third color beam are different from each other.

26. The projection apparatus as claimed in claim 16, further comprising a first reflective element, disposed at a side of the first light emitting device, wherein the first light emitting device is located between the first reflective element and the first phosphor layer, and the second light beam from the second light emitting device after sequentially passing through the second phosphor layer, the beam combining element and the first phosphor layer is reflected by the first reflective element to be transmitted back to the first phosphor layer.

27. The projection apparatus as claimed in claim 16, further comprising a second reflective element disposed at a side of the second light emitting device, wherein the second light emitting device is located between the second reflective element and the second phosphor layer, and the first light beam from the first light emitting device after sequentially passing through the first phosphor layer, the beam combining element and the second phosphor layer is reflected by the second reflective element to be transmitted back to the second phosphor layer.

28. The projection apparatus as claimed in claim 16, further comprising a first optical film disposed between the first light emitting device and the first phosphor layer, wherein the first light beam and the second light beam are capable of passing through the first optical film, and the first optical film is capable of reflecting the first color beam.

29. The projection apparatus as claimed in claim 16, further comprising a second optical film disposed between the second light emitting device and the second phosphor layer, wherein the first light beam and the second light beam are capable of passing through the second optical film, and the second optical film is capable of reflecting the second color beam.

30. The projection apparatus as claimed in claim 16, wherein the first color beam and the second color beam both reflected by the beam combining element are located on a same transmission path.

* * * * *